United States Patent [19]
Jeffs

[11] Patent Number: 5,458,973
[45] Date of Patent: * Oct. 17, 1995

[54] GRANULAR FILLER

[75] Inventor: David G. Jeffs, Cornwall, England

[73] Assignee: ECC International Ltd., England

[*] Notice: The portion of the term of this patent subsequent to Jul. 2, 2008, has been disclaimed.

[21] Appl. No.: 238,962

[22] Filed: Apr. 29, 1994

Related U.S. Application Data

[60] Continuation of Ser. No. 899,900, Jun. 17, 1992, abandoned, which is a division of Ser. No. 554,868, Jul. 20, 1990, Pat. No. 5,188,778.

[30] Foreign Application Priority Data

Jul. 24, 1989 [GB] United Kingdom .................... 8916875
Jul. 28, 1989 [GB] United Kingdom .................... 8917335

[51] Int. Cl.$^6$ ..................................................... B32B 9/00
[52] U.S. Cl. ........................... 428/402; 428/403; 428/407; 428/323; 428/324; 428/325; 428/327; 523/205; 523/215; 523/334; 106/476
[58] Field of Search ..................................... 428/402, 403, 428/407, 323, 324, 325, 327; 523/205, 215, 334; 106/476

[56] References Cited

U.S. PATENT DOCUMENTS

| | | | |
|---|---|---|---|
| 2,123,482 | 7/1938 | de Jong | 523/342 |
| 2,644,772 | 7/1953 | Kaye | 427/221 |
| 3,068,185 | 12/1962 | Stamberger | 523/209 |
| 3,080,256 | 3/1963 | Bundy | 523/209 |
| 3,194,781 | 7/1965 | Hedberg et al. | 523/334 |
| 3,317,458 | 5/1967 | Clas et al. | 523/334 |
| 3,328,383 | 6/1967 | Roscher et al. | 264/115 |
| 3,346,518 | 10/1967 | Sutherland, Jr. | 521/71 |
| 3,664,909 | 5/1972 | Ackley | 161/141 |
| 3,684,645 | 8/1972 | Temple et al. | 161/141 |
| 3,713,962 | 1/1973 | Ackley | 161/154 |

(List continued on next page.)

FOREIGN PATENT DOCUMENTS

| | | |
|---|---|---|
| 1002824 | 1/1977 | Canada . |
| 0036749 | 9/1981 | European Pat. Off. . |
| 0148762 | 7/1985 | European Pat. Off. . |
| 0202012 | 11/1986 | European Pat. Off. . |
| 0213931 | 3/1987 | European Pat. Off. . |
| 0255316 | 2/1988 | European Pat. Off. . |
| 0277244 | 8/1988 | European Pat. Off. . |
| 1277177 | 10/1961 | France . |
| 2311825 | 12/1976 | France . |
| 2338978 | 8/1977 | France . |
| 2360871 | 6/1974 | Germany . |
| 48-052841 | 7/1973 | Japan . |
| 50-65542 | 6/1975 | Japan . |
| 50-095347 | 7/1975 | Japan . |
| 56-100837 | 1/1980 | Japan . |
| 56-004645 | 1/1981 | Japan . |
| 56-149443 | 11/1981 | Japan . |
| 60-008301 | 6/1983 | Japan . |
| 735609 | 10/1977 | U.S.S.R. . |
| 625872 | 7/1949 | United Kingdom . |
| 767681 | 2/1951 | United Kingdom . |
| 920466 | 3/1963 | United Kingdom . |
| 936911 | 9/1963 | United Kingdom . |
| 1039540 | 8/1966 | United Kingdom . |
| 1263496 | 2/1972 | United Kingdom . |
| 1280216 | 7/1972 | United Kingdom . |

(List continued on next page.)

OTHER PUBLICATIONS

"Concise Encyclopedia", *Polymer Materials*, p. 503.

Primary Examiner—Patrick J. Ryan
Assistant Examiner—Marie R. Macholl
Attorney, Agent, or Firm—Klauber & Jackson

[57] ABSTRACT

A granular filler comprising a particulate inorganic material; from 0.1% to 10% by weight, based on the weight of the organic material, of fine carbon black; and sufficient amount of a natural or synthetic latex composition to provide from 1% to 10% by weight of elastomer solids, based on the weight of the inorganic material, wherein the granules have diameters within the range of from 0.01 mm to 0.1 mm.

5 Claims, 4 Drawing Sheets

U.S. PATENT DOCUMENTS

| | | | |
|---|---|---|---|
| 3,846,365 | 11/1974 | Berg et al. | 524/525 |
| 3,850,723 | 11/1974 | Ackley | 156/180 |
| 3,878,153 | 4/1975 | Driscoll | 523/328 |
| 3,920,604 | 11/1975 | Berg et al. | 523/333 |
| 3,945,978 | 3/1976 | Berg et al. | 523/210 |
| 3,953,389 | 4/1976 | Holliday et al. | 523/330 |
| 3,963,512 | 6/1976 | Swift et al. | 523/209 |
| 3,985,703 | 10/1976 | Ferry et al. | 523/201 |
| 3,985,704 | 10/1976 | Jones et al. | 523/342 |
| 3,992,558 | 11/1976 | Smith-Johannsen et al. | 427/213 |
| 4,011,195 | 3/1977 | Self | 260/40 R |
| 4,017,452 | 4/1977 | Schwarz | 523/209 |
| 4,026,970 | 5/1977 | Backderf et al. | 525/218 |
| 4,031,056 | 6/1977 | Patel et al. | 523/324 |
| 4,044,188 | 8/1977 | Segal | 428/283 |
| 4,062,692 | 12/1977 | Hemmerich et al. | 106/300 |
| 4,065,426 | 12/1977 | Yamawaki et al. | 523/334 |
| 4,073,755 | 2/1978 | Berg et al. | 523/334 |
| 4,151,126 | 4/1979 | Adelman et al. | 252/508 |
| 4,244,863 | 1/1981 | Hemmerich et al. | 523/334 |
| 4,263,344 | 4/1981 | Radvan et al. | 427/150 |
| 4,263,352 | 4/1981 | Kaltenbach et al. | 427/379 |
| 4,313,973 | 2/1982 | McMurtry et al. | 427/205 |
| 4,315,959 | 2/1982 | BrandtsBuys et al. | 427/214 |
| 4,329,194 | 5/1982 | Green et al. | 156/179 |
| 4,337,294 | 6/1982 | Gunnell | 428/407 |
| 4,366,285 | 12/1982 | Lukaschek et al. | 524/521 |
| 4,368,222 | 1/1983 | Blegen et al. | 427/340 |
| 4,369,264 | 1/1983 | Baumann et al. | 523/209 |
| 4,374,941 | 2/1983 | Sandstrom | 523/206 |
| 4,375,497 | 3/1983 | Sandstrom | 428/407 |
| 4,430,436 | 2/1984 | Koyama et al. | 436/531 |
| 4,434,255 | 2/1984 | Charon et al. | 523/209 |
| 4,474,845 | 10/1984 | Hagerman et al. | 428/283 |
| 4,481,329 | 11/1984 | Ambler et al. | 524/501 |
| 4,483,886 | 11/1984 | Kowalski | 427/213 |
| 4,501,790 | 2/1985 | Aizawa et al. | 428/283 |
| 4,578,411 | 3/1986 | Budd et al. | 524/156 |
| 4,599,114 | 7/1986 | Atkinson | 106/300 |
| 4,602,052 | 7/1986 | Weber et al. | 523/215 |
| 4,603,153 | 7/1986 | Sobajima et al. | 523/209 |
| 4,603,167 | 7/1986 | Mahalek et al. | 524/706 |
| 4,608,401 | 8/1986 | Martin | 523/205 |
| 4,642,330 | 2/1987 | Quinn | 528/335 |
| 4,670,331 | 6/1987 | Radvan et al. | 428/303 |
| 4,734,321 | 3/1988 | Radvan et al. | 428/283 |
| 4,761,440 | 8/1988 | Laroche | 523/217 |
| 4,788,231 | 11/1988 | Smigerski et al. | 523/334 |
| 4,800,103 | 1/1989 | Jeffs | 427/221 |
| 4,983,247 | 1/1991 | Kim | 156/272.2 |
| 5,021,297 | 6/1991 | Rhue et al. | 428/430 |
| 5,028,482 | 7/1991 | Jeffs | 428/323 |
| 5,047,198 | 9/1991 | Kim | 264/257 |
| 5,071,891 | 12/1991 | Harrison et al. | 523/209 |

FOREIGN PATENT DOCUMENTS

| | | |
|---|---|---|
| 1392923 | 5/1975 | United Kingdom . |
| 1447977 | 9/1976 | United Kingdom . |
| 1536443 | 12/1978 | United Kingdom . |
| 1580626 | 12/1980 | United Kingdom . |
| 2126239 | 3/1984 | United Kingdom . |
| 2179655 | 3/1987 | United Kingdom . |
| WO88/00608 | 1/1988 | WIPO . |
| WO88/06606 | 9/1988 | WIPO . |

GRANULAR FILLER

This application is a continuation of application Ser. No. 07/899,900, filed Jun. 17, 1992 (now abandoned), which is a divisional of application Ser. No. 07/554,868, filed Jul. 20, 1990 (now U.S. Pat. No. 5,188,778).

This invention relates to a process for the surface enhancement of articles of fibre reinforced plastics material.

U.S. Pat. No. 4,734,321 sets forth a process for making a permeable sheet-like material comprised of unconsolidated particulate plastics (especially thermoplastics material, and relatively short reinforcing fibres, typically 50 millimeters or less in length. After intermediate processing to cause the plastics component to be brought to a molten condition and fully wet the reinforcing fibres, the material is suitable for chill moulding into fibre reinforced plastics articles. Various intermediate processing routes can be used.

Thus, for example, and as described in the aforementioned United States Patent, the permeable material may be subjected to heat and pressure and then cooled to form a consolidated sheet. Before use in a moulding process, the sheet is reheated so that the plastics component softens and permits the stresses in the fibre reinforcement to relax and re-expand the sheet, which can then be chill moulded.

The use of short single fibres in the starting material has considerable advantages in that they flow readily with the molten thermoplastic in which they are entrained when subjected to pressure in the mould. This results in a very even distribution of the fibres through the moulding to give consistent reinforcement throughout the moulded structure, even in the most intricate mouldings.

In the chill moulding process, a charge material preheated to above the melt temperature of the plastics component is charged into a mould in which the mould parts are controlled at a temperature lower than that at which the plastics component will solidify. Moulding pressure is then applied to the hot charge sufficiently fast to cause both the plastics and fibre components of the charge to flow into the configuration of the mould before solidification of the plastics component occurs.

Chill moulding is a well known technique for moulding unreinforced plastics materials. It has however been found that its use for moulding plastics materials reinforced with short fibres can result in surface marring of the final moulding. For different reasons other kinds of fibre reinforced thermoplastic material can also suffer from surface defects due to fibre protrusion.

The production process for the starting material as set forth in the U.S. Pat. No. 4,734,321 causes the component fibres to be oriented generally in the plane of the sheet. It has however been found that where surface marring occurs during subsequent moulding, it is caused by the projection of fibres through the surface of the sheet.

Another form of fibre reinforced plastics sheet is produced by laminating together, in a platen press, layers of needled glass fibre mat and thermoplastic resin such as polypropylene. Methods used to produce such products are described in U.S. Pat. Nos. 3,664,909, 3,684,645, 3,713,962 and 3,850,723. However, it has been found that the use of such sheets in chill moulding or stamping operations results in slight protrusion of the fibres at the surfaces of the resulting moulding so that apparent visual irregularities in the surface occur.

Another system for forming fibre reinforced plastics sheet is disclosed in U.S. Pat. No. 3,328,383 in which a mixture of glass and thermoplastic fibres is laid down on a flat surface and then consolidated by pressure after heating. Here again, subsequent moulding of the consolidated sheet results in fibre strike through at the surfaces of the sheet.

It is among the objects of the present invention to improve the surface finish of mouldings formed from sheets of the kind heretofore described.

According to the present invention a process for preparing a permeable sheet of glass fibre reinforced thermoplastic material for moulding into a shaped product includes binding thereto a surface layer of particulate material which is compatible with or inert to the thermoplastic content of said sheet and which acts to improve the surface finish thereof when the sheet is subsequently heated and chill moulded under pressure.

The particulate material may be a mineral filler, for example a clay, carbon black or titanium dioxide calcium carbonate, a thermoplastic, a thermosetting plastic, an antioxidant material, a pigment or a mixture of such materials. Alternatively, or in addition, inorganic fillers being for example described in International (PCT) Patent Application No. WO 88/006606 and United Kingdom Patent Application No. 2 179 665 A.

The formation of a particulate surface coating has especial advantages in terms of sheet handling when used with sheet materials of the kind disclosed in U.S. Pat. No. 4,734,321. Because each particle is directly or indirectly bound individually to the sheet surface, it interferes neither with the flexibility of the sheet, nor significantly with its permeability. As a result, the sheet can be reeled and also pre-heated prior to moulding by the transmission of hot air through the sheet, for example as described in European Patent Application No. 85.300033 (Publication No. 0 148 762).

Such particulate coatings also have advantages for use with other forms of fibre reinforced plastics sheet. Thus, the use of a mineral filler in the surfacing layer has been found to increase the viscosity of the plastic content of the sheet at the surface so as to resist surface strike through by the reinforcing fibre. The use of particulate plastics materials in the surfacing layer produces a surface enrichment of the plastic content with a similar result.

The particulate surface layer may be applied by a number of techniques. Thus for example an aqueous coating of a dispersion of the particulate material may be applied in a conventional manner on an aqueous coater. Alternatively, a surfactant may be added and the dispersion turbulated to form a foam, the foam then being applied as a coating as described in UK Patent No. 1 039 540 or U.S. Pat. No. 4,263,344.

Still again, the particulate material may be applied as a dry powder by various techniques, provided that process conditions are such as to ensure that the powder bonds to the sheet.

An aqueous dispersion may be applied at a consistency in water of 0.5 to 30% (Wt/Wt) or 5 to 300 grammes per liter of water. For a typical production rate of 7 meters per minute of sheet to be coated, the coating would be applied at a rate of 0.8 to 500 liters per minute per meter of sheet width.

A foamed coating may be applied at a rate of between 50 to 500 grammes per square meter, with the consistency in foam being 0.5 to 10% (Wt/Wt) or 5 to 100 grammes per liter of water. For an air content of 67% this is equivalent to 1.6 to 33 grammes per liter of foam.

The sheet is coated at a typical production rate of 5 meters per minute, with the flow rate range for the foam being from 8 to 4000 liters per minute per meter width of the sheet.

Dry powders may be applied at a rate of between 50 and 500 grammes per square meter at a typical production rate of 7 square meters per minute.

In a known process for making glass mat-reinforced thermoplastic sheet material a mixture of chopped glass fibres, polypropylene powder and an inorganic filler, such as kaolin, calcium carbonate, talc, mica, titanium dioxide or alumina trihydrate, is dispersed in water containing a surfactant (which may be anionic or nonionic), using a high speed mixer, to form a stable foam of relatively low solids content. This foam is spread uniformly over the surface of a travelling wire mesh, such as that conventionally used in a Fourdrinier paper making machine, and the aqueous phase is withdrawn through the wire mesh by gravity and suction. The mat of solid materials thus formed on the upper surface of the wire mesh is then dried at a temperature of about 100° C. The resultant dried mat, usually after being cut into pieces of suitable size and stacked to form a multi-layer sheet material, is pressed between steel plates at a temperature of about 200° C. and then allowed to cool in the press to form a sheet-like component, such as a car body panel. Alternatively, the stacks of cut pieces may be heated to about 200° C. by means of a current of hot air or by infra red radiation and subsequently allowed to cool in a press at about 60° C. to form the sheet-like material.

In addition to the glass fibres, polypropylene and inorganic filler it is often necessary to include in the starting mixture for the glass mat-reinforced thermoplastic material a small amount, normally up to about 4% by weight of the total solid material, of carbon black. (Carbon black is the term used widely to describe a range of fine carbon products which may be made by partial combustion or thermal decomposition of hydrocarbons in the vapour phase. The ultimate colloidal units of carbon black may occur as aggregates, which are fused assemblies of particles. Typically, carbon blacks may have particle diameters up to 500 nanometers. Most carbon blacks have an elemental carbon composition greater than 90%.) The carbon black is introduced not only to render the final sheet material black in colour, as is often required in commerce, but also to provide a screening effect against the harmful action of ultraviolet radiation on the material. However, when carbon black is introduced into the starting mixture problems are experienced because of the well known difficulties of handling fine carbon black powder without creating a cloud of black particles which settle out over a wide area. This problem is especially severe when dry carbon black is mixed with a dry thermoplastic material. The retention of the fibre carbon black in the mat during the forming operation on the wire mesh has also been found to be poor, and it is generally found that the carbon black is unevenly dispersed in the final dried and pressed material, with the result that the sheet material has a veined or mottled appearance with dark areas having a high concentration of carbon black alternating with areas which are light in colour and almost translucent.

It is also often advantageous to include in the starting mixture for the glass mat-reinforced thermoplastic material from 0.1% to 10% by weight, based on the weight of inorganic filler, of an antioxidant.

GB-A-2 179 665 described a process for preparing an inorganic filler which process comprises treating a particulate inorganic filler with a natural or synthetic latex composition and dewatering and drying the resultant mixture. The surface-treated inorganic filler can be used with advantage in a polymeric resin composition.

It has now been found that an improved glass mat-reinforced thermoplastics material may be obtained if the mat of solid materials formed on the upper surface of the wire mesh of the Fourdrinier paper making machine is coated with a composition comprising an aqueous suspension of a mixture of polypropylene powder, inorganic filler granules, a foaming agent and, optionally, additional natural or synthetic latex solids. It has been found that when uncoated glass mat-reinforced thermoplastic material in the form of a stack of cut pieces is hot pressed as described above, there is a tendency for the reinforcing glass fibres to be pressed through the surface of the sheet material giving a round "hairy" texture to the surface. However, if at least one side of each mat is coated with a composition of the type described above, and a stack of cut pieces of mat is prepared so that a coated surface is outermost on each side of the stack, the surface of the pressed, sheet-like component is effectively sealed so that the glass fibres are prevented from projecting through the surface.

A granular filler for use in the present invention, suitable for incorporating in a composition for use in coating the surface of a glass mat-reinforced thermoplastic material, comprises (a) a particulate inorganic material, (b) from 0.1% to 10% by weight, based on the weight of the inorganic material, of fine carbon black, and (c) sufficient of a natural or synthetic latex composition to provide from 1% to 10% by weight of elastomer solids, based on the weight of the inorganic material, and wherein the granules have diameters in the range of 0.01 mm to 0.1 min.

A composition, for use in coating the surface of a glass mat-reinforced thermoplastic material according to the invention comprises an aqueous suspension of a polypropylene powder, a granular filler according to said one aspect of the invention, and a foaming agent. Advantageously, the composition also includes natural or synthetic latex solids additional to that present in the granular filler.

BRIEF DESCRIPTION OF THE DRAWINGS

The invention will now be further described with reference to the accompanying drawings in which.

DESCRIPTION OF THE PREFERRED EMBODIMENT

Figure 1:
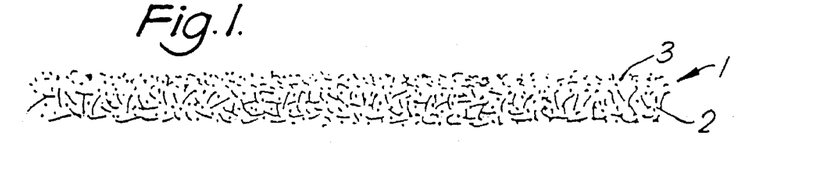
FIG. 1 is a sectional elevation of a permeable fibre reinforced plastics sheet material having a particulate surface layer according to the invention.
Figure 2:
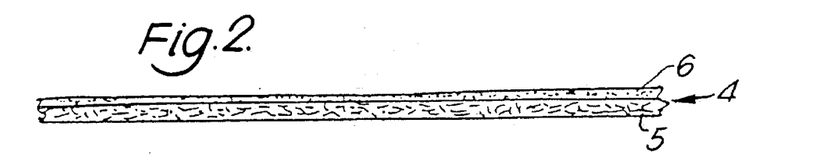
FIG. 2 is a sectional elevation of the sheet of FIG. 1 after consolidation under heat and pressure.

Referring first to FIG. 1, this shows a permeable sheet material comprised of a substrate 2 made according to the process described in U.S. Pat. No. 4,734,321, to which a particulate surface layer 3 has been bonded. When cooled after subjection to heat and pressure, in a chill moulding process, a consolidated sheet or moulding 4 is formed as shown in FIG. 2, the moulding 4 having a fibre reinforced base layer 5 and an unreinforced surface layer 6, the layers 5 and 6 being derived respectively from the layers 2 and 3 in FIG. 1.

If desired, the substrate 2 may alternatively be formed by dry laying a mixture of reinforcing fibres and thermoplastics material generally as described in U.S. Pat. No. 3,328,383, the disclosure whereof is incorporated herein by reference, a particulate layer then being applied to the resulting substrate prior to heat fusion into a permeable structure.

Figure 3:
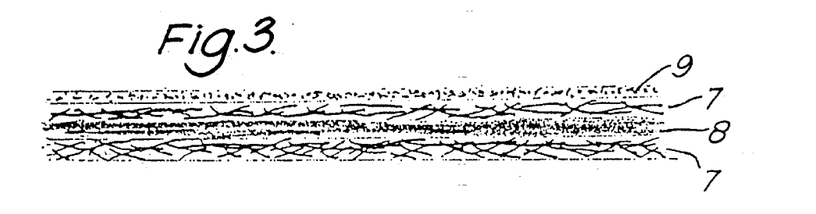
FIG. 3 is a sectional elevation of another permeable fibre reinforced plastic sheet according to the invention.

Referring now to FIG. 3, this shows a sheet structure comprising two glass fibre mats 7 between which a layer 8 of a thermoplastics material has been extruded so as to bond them together. A surfacing layer 9 of particulate material is also bonded to one of the glass fibre mats.

Figure 4:
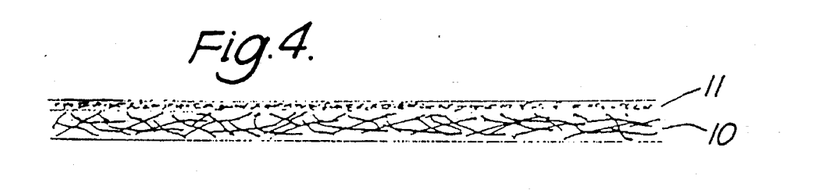
FIG. 4 is a sectional elevation of the sheet of FIG. 3 after consolidation under heat and pressure.

FIG. 4 shows the construction of FIG. 3 when cooled after subjection to heat and pressure in a chill moulding process. The thermoplastic layer 8 has filled the interstices in the glass fibre mats 7 to form an integrated base structure 10, a continuous surface layer 11 being simultaneously formed from the particulate layer 9.

The character of the particulate layers 3 and 9 in FIGS. 1 and 3 can vary in dependence upon the character of the substrate to which they are being applied and the end result required in the moulded article. Thus, particles of a mineral filler mixed with a sufficient quantity of binder to adhere them to the surface of the substrate may be appropriate in some cases. During the moulding process, the filler acts to increase the viscosity of the thermoplastic near the surface of the base layer and resist the strike through of fibres. Alternatively, particles of thermoplastic may be used, which, when melted, have the effect of enriching the surface portions of the laminate with thermoplastic and preventing the strike through of fibres. Again, thermoplastic coated mineral particles may be used alone or in combination with thermoplastic particles to form the surface layer. Suitable particulate materials are disclosed in International (PCT) Publication No. WO 88/00608 and in United Kingdom Patent Application No. 2 179 7665 A. The particulate material added as a surface layer may also include particulate antioxidant material.

Figure 5:
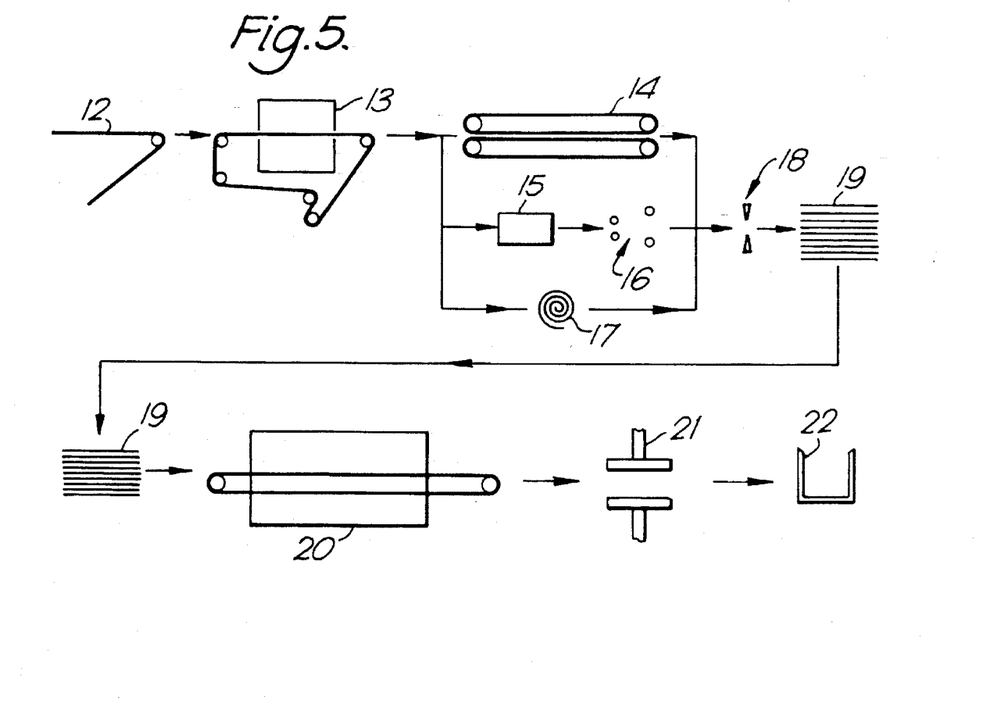
FIG. 5 is a diagrammatic representation of the sequence of operations in one process for manufacturing a fibre reinforced plastics material and in which a particulate surface layer according to the invention may be applied.

Referring now to FIG. 5, this shows a sequence of operations for manufacturing a fibre reinforced plastics moulding. As will be subsequently explained, the particulate surfacing layer can be applied at various points in this sequence.

FIG. 5 shows a Fourdrinier wire 12 on which a flexible and permeable open sheet-like structure is formed from reinforcing fibres and particulate plastics material, generally as described in U.S. Pat. No. 4,734,321 This sheet structure is passed through a heater/dryer 13 as described in this patent and is then treated in one of three different ways. It may be consolidated in a double belt press 14, again as described in U.S. Pat. No. 4,734,321. Alternatively, the permeable sheet may be pre-heated in a heater 15 and then consolidated and re-expanded in a nip roller system 16 of the kind described in European Patent Application No. 87306602 (Publication No. 0 255 316). This system produces a rigid but permeable sheet. As a second alternative, the permeable sheet material produced on the Fourdrinier wire 12 may be reeled as shown at 17 for further use without any intermediate treatment.

It will be seen that the alternative processes proposed will result in an impermeable consolidated sheet, an-impermeable semi-expanded sheet or a permeable flexible (reeled) sheet. By the use of a guillotine 18 these three forms of material may be converted into sheets as shown at 19.

The sheets 19 are then fed sequentially through a preheater 20 prior to chill moulding in a mould 21 so as to form a fibre reinforced plastics moulding 22. The type of preheater 20 used will depend upon the nature of the sheets being heated. For impermeable sheets, the use of infra red heating is appropriate, but where the sheets are permeable, flat bed or rotary through air heaters may be used. Microwave heating may also be used for all forms of sheet.

A surface layer of particulate material may be applied at various positions in the sequence of operations above described, the optimum position would depend upon both the nature of the particulate material being applied and of the sheet to which it is being applied.

Figure 6:
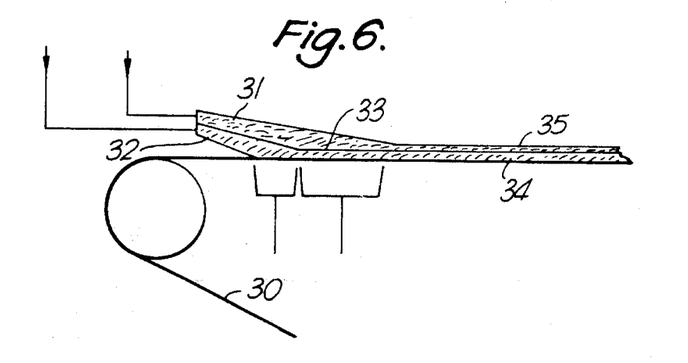
FIGS. 6 to 9 are four semi-diagrammatical sectional elevations showing four different kinds of apparatus for forming permeable fibre reinforced plastic sheet material according to the invention.

FIG. 6 shows a Fourdrinier wire 30 having a multiple flow box 31 associated therewith. The flow box 31 feeds a mixture of foamed fibres and particulate plastics material onto the wire 30 through a section 32 and a foamed particulate material onto the upper surface of the web thus laid down through a second section 33. The base and surface layers 34 and 35 thus formed are simultaneously drained through the wire.

Figures 7, 8:
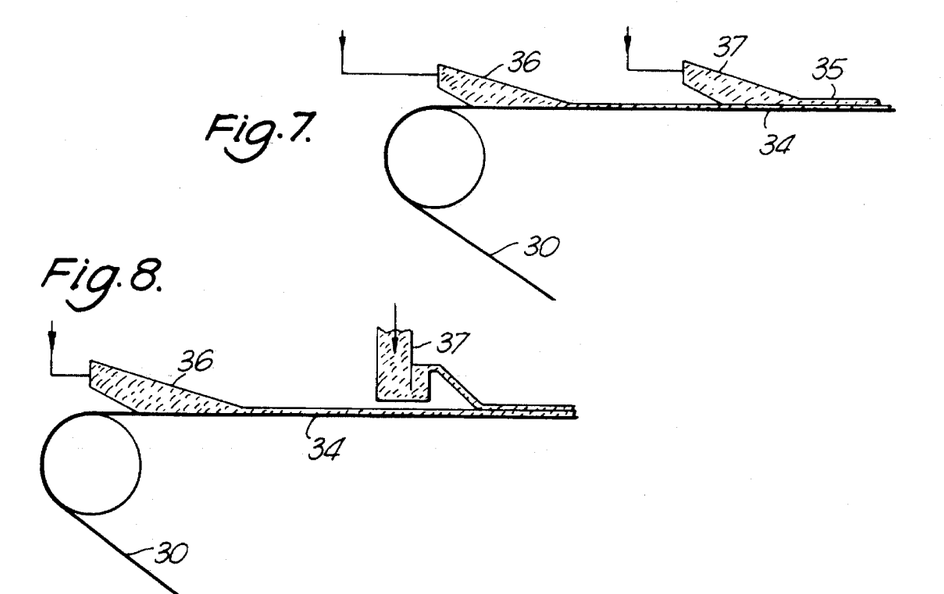

FIG. 7 shows a configuration similar to that of FIG. 6. In this case however separate flow boxes 36 and 37 are provided for laying down respectively the base and surface layer from foamed dispersions.

FIG. 8 shows a configuration for use in applying a surface layer from an aqueous dispersion. Here, the base sheet 34 is laid down from a foamed dispersion through a flow box 36 and the surface layer is applied from an aqueous dispersion by a curtain coater 37.

Figure 9:
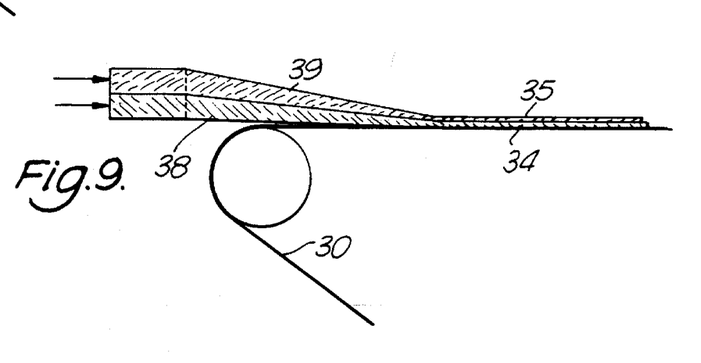

FIG. 9 shows a configuration in which the layers 34 and 35 are laid down from a multiple layer head box of the kind sold by KMW or by Beloit under the trade name "CONVERFLO". The base layer 34 is laid down from a foamed stock fed through the lower slide 38 of the head box and the surface layer of particulate material is laid down from the upper slide 39 of the head box.

Figures 10, 11:
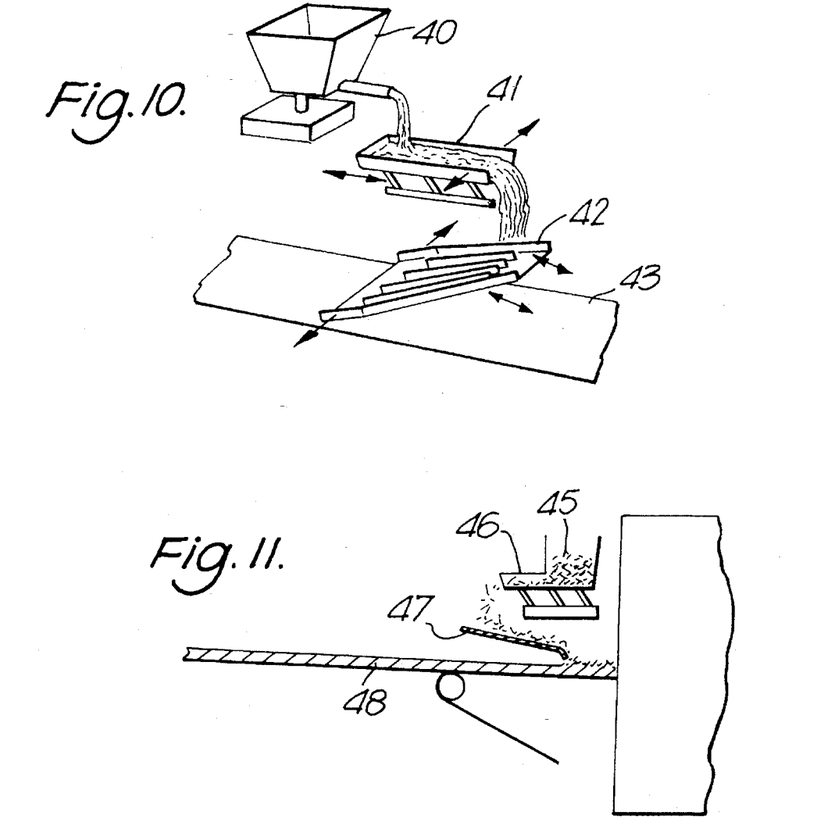
FIGS. 10 to 12 are semi-diagrammatic views showing various techniques for distribution of dry particles, on a web of sheet material.

FIG. 10 shows a system which is usable at the entrance to the dryer or the pre-heater shown in FIG. 5. The system comprises a loss-in-weight screw or belt feeder 40 which may be of the kind sold by K-Tron Soder AG of Switzerland. The screw feeder supplies particulate material to a shaker tray 41 which in turn deposits the material on a distribution shute 42 from which it falls onto the web 43. Subsequent heating in the dryer or heater causes the particulate material to bond to the web.

FIG. 11 shows a similar system in which materials such as thermoplastic fibres 45 are deposited by a vibratory loss in weight feeder 46 onto a shute 47, similar to the shute 42 and thence onto the web 48. Again, the fibres are bonded to the web during passage through the dyer or heater.

The systems disclosed in FIG. 10 and 11 may also be used at the exits to the dryer or heater provided that the temperature of the emerging base material is sufficient to cause the particulate material to fuse thereto.

Figure 12:
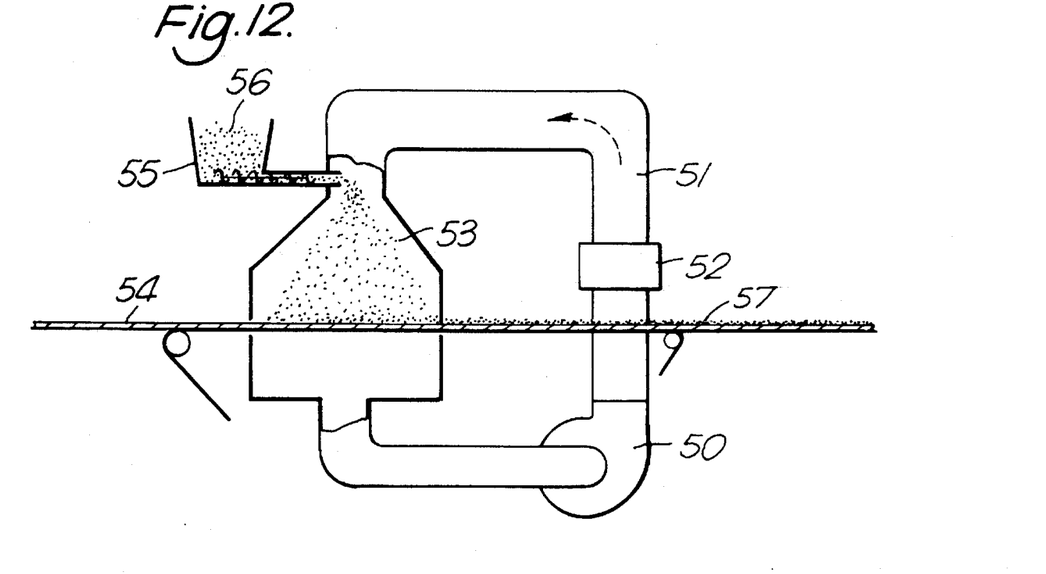

FIG. 12 shows a system for applying particulate material to a porous web within a dryer or heater. Air from a fan 50 is circulated through a ducking circuit 51 which includes a heating bank 52 and a heating chamber 53 through which the web 54 passes. A screw feeder 55 feeds particulate material 56 into the heating chamber above the web, the material being distributed across the web by air turbulence and simultaneously bonded thereto to form a surface layer 57.

Figure 13:
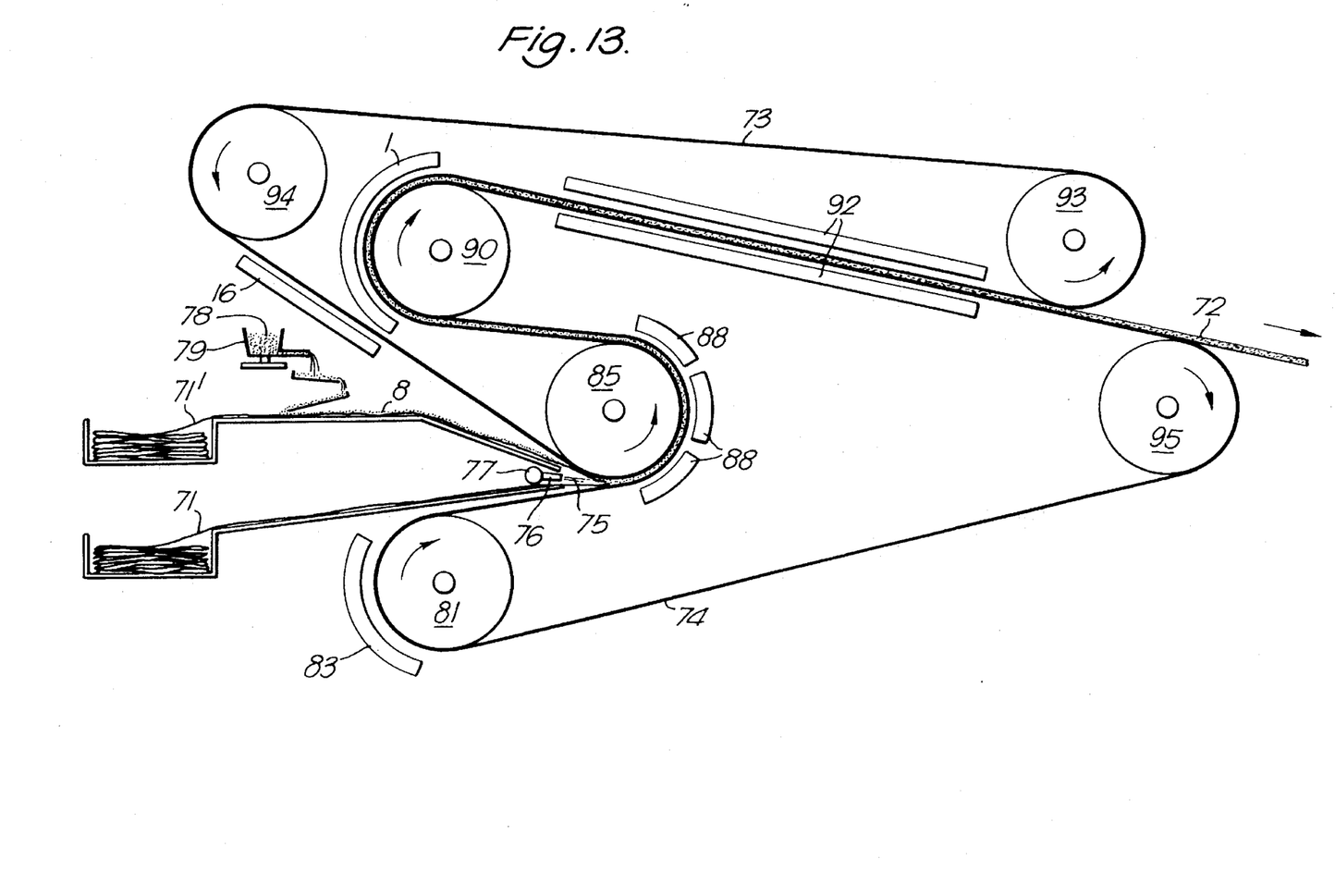
FIG. 13 is a diagrammatic illustration of continuous laminating process for producing fibre reinforced plastics sheets.

As shown in FIG. 13, a double belt laminating machine is employed to produce a continuous sheet 72 which is composed of a resin and fibre glass mat. In the process depicted fibre glass mats 71 and 71' are fed between two laminating belts 73 and 74. Molten resin 75 is fed between the mats 71 and 71' from an adjustable slot 76 located along the length of an extrusion die 77. Particulate material 78 is also distributed across the surface of the mat 71' by a powder feeder system 79, which may be of the kind shown in FIG. 10 above.

Belt 74 as it passes around the roller 81 is pre-heated by a heater 83 prior to its engagement with the heating, press roll 85. Similarly, belt 73 is pre-heated by heater 86 prior to its engagement with press roll 85. The heating, press roll is equipped with heaters 88. Pressure is applied to the laminate 72 by applying tension to the belts 73 and 74. Tension applied to the belts 73 and 74 results in the application of radial forces on the resin mat composite. The radial forces and the resulting pressures assist in saturating the mats 71 and 71' with resin when coupled with the heat applied as the tension is applied. Roll 94 applies tension to belt 73 and roll 95 applies tension to belt 74. The material as a compact sheet of resin and fibre glass resulting from the passage of the materials around the press roll 85 is then passed to a cooling roll 90 between the belts 73 and 74 and during its passage over this roll is partially cooled but not completely solidified. The roll 90 is equipped with a cooler 91 to reduce the temperature of the belts and the resin. The sheet after leaving roll 90 in between the belts 73 and 74 is then passed through another elongated cooling zone 92 to further reduce the temperature of the belts 73 and 74 to further cool and solidify the mats and resin into sheet 72. Belt 73 is then reflexed over roll 93 for return to the tension roll 94 and belt 74 is returned over roller 95 to the roll 81 with the product 72 being removed at the point where belts 73 and 74 separate.

The particulate material 78 may be either a mineral, a thermoplastic, a thermosetting plastic or an antioxidant or mixtures or compounds of such materials. When embodied in the sheet product it has the effect, for the reasons stated above, of preventing fibre strike through at the surface.

A granular filler suitable for incorporating in a composition for use in coating the surface of a glass mat-reinforced thermoplastic material, comprises (a) a particulate inorganic material, (b) from 0.1% to 10% by weight, based on the weight of the inorganic material, of fine carbon black, and (c) sufficient of a natural or synthetic latex composition to provide from 1% to 10% by weight of elastomer solids, based on the weight of the inorganic material, and wherein the granules have diameters in the range of 0.01 mm to 0.1 mm.

A composition, for use in coating the surface of a glass mat-reinforced thermoplastic material according to the invention comprises an aqueous suspension of a polypropylene powder, a granular filler according to said one aspect of the invention, and a foaming agent. Advantageously, the composition also includes natural or synthetic latex solids additional to that present in the granular filler.

The size of the granules which make up the filler is important because it is necessary for the granules to be relatively fine if the inorganic material, latex solids and carbon black constituting the granules are to be substantially uniformly dispersed in the surface layer of the glass mat-reinforced thermoplastic material. Also, if the granules are relatively fine there is less likelihood of the carbon black being in an aggregated state and a more intense and more uniform black pigmentation is therefore obtained.

The filler granules may also contain from 0.1% to 10% by weight, based on the weight of the inorganic material, of an antioxidant for the polypropylene. The antioxidant may conveniently be of the non-staining hindered phenol type.

The particulate inorganic material may be a kaolinitic clay (e.g. kaolin or ball clay), a calcined kaolinitic clay, a calcium carbonate, a silicate of aluminium and calcium (e.g. the natural calcium silicate known as wollastonite), bauxite, talc, mica, alumina trihydrate, silica, carbonates and hydroxides of magnesium (e.g. natural hydrotalcite), dolomite (i.e. the natural double carbonate of calcium and magnesium), calcium sulphate (e.g. gypsum) and titanium dioxide. The inorganic material may be natural or synthetic and, in particular, both natural and synthetic forms of calcium carbonate, silicates of aluminium and calcium, silica, carbonates and hydroxide of magnesium, alumina trihydrate, calcium sulphate and titanium dioxide are within the scope of this invention. Where the material is synthetic it may be precipitated (as with calcium carbonate, silica and titanium dioxide). More generally, it has been found that the inorganic materials which are most suitable for use in the invention are those which may be regarded as white inorganic materials. (It is to be noted in this connection that the term "white" used in relation to "inorganic material" does not mean that the mineral necessarily has a pure-white colour, but that it is substantially free of any strong non-white hue.) Many of the inorganic materials which may be employed in the present invention are crystalline. Preferably, the particles should be no larger than about 50 microns, and most preferably no larger than 20 microns in diameter.

The filler granules are preferably prepared in the form of hollow microspheres and can most suitably be produced by spray drying an aqueous suspension. Most preferably the suspension is dewatered in a spray dryer of the fountain nozzle type, as this type of spray dryer enables good control to be coated over the size of the microspheres produced in the desired size range of 0.01 mm to 0.1 mm. A suitable aqueous suspension may be prepared by dispersing together in water, which preferably contains a dispersing agent, the inorganic material, carbon black, a latex composition and, optionally, an antioxidant.

A preferred process for preparing the filler granules comprises the following steps:

a) fine carbon black is mixed with water containing a dispersing agent to form a suspension, preferably containing from about 5% to about 25% by weight of carbon black;

b) a suspension, preferably containing from 50% to 65% on a dry weight basis, of a white inorganic material and a dispersing agent for the inorganic material, is mixed with the carbon black suspension formed in step a) in proportions such that the quantity of carbon black is preferably in the range of from 0.1% to 10% on a dry weight basis, based on the weight of the inorganic material;

c) there is mixed with the inorganic material/carbon black suspension formed in step b) sufficient of a natural or synthetic latex composition to provide from 1% to 10% by weight of latex solids, based on the weight of the inorganic material; and, d) the mixed suspension formed in step c) is spray dried to form hollow microspheres of substantially dry material having diameters in the range of from 0.01 mm to 0.1 mm.

In step a) the dispersing agent may be, for example, a water-soluble salt of poly(acrylic acid), poly(methacrylic acid) or a copolymer containing from 10% to 80% by weight of acrylonitrile or methacrylonitrile monomer units and from 90% to 20% by weight of acrylic acid or methacrylic acid monomer units. The number average molecular weight of the water-soluble polymer is preferably not more than about 10,000. The amount of the dispersing agent used is preferably in the range of from 0.1% to 5% by weight, based on the weight of dry carbon black.

In step b) the dispersing agent for the inorganic material is advantageously a water-soluble salt of poly(acrylic acid) or poly(methacrylic acid) having a number average molecular weight of not more than 10,000. Preferably, the dispersing agent used for the inorganic material is the same as that used for the carbon black. The amount of the dispersing agent used is preferably in the range of from 0.05%. to 0.5% by weight, based on the weight of the dry inorganic material. The inorganic material does not require any chemical pre-treatment other than dispersion with a dispersing agent.

In step c) the latex may be one of a natural rubber, or of a natural rubber which has been substituted with functional groups, or of a synthetic rubber such as a styrene butadiene rubber (SBR). Other suitable lattices include those formed from acrylic copolymers (either elastomeric or non-elastomeric, although elastomeric is preferred) and non-elastomeric materials such as poly(vinyl acetate) and copolymers of vinyl acetate.

The acrylic copolymer may be a copolymer of a lower alkyl ester of acrylic acid with a lower alkyl ester of methacrylic acid. Particularly preferred are copolymers of ethyl acrylate and methyl methacrylate. Also suitable are copolymers of one or other or both of a lower alkyl ester or acrylic acid and a lower alkyl ester of methacrylic acid with a further monomer chosen from vinyl acetate, styrene, acrylonitrile and mixtures thereof. The alkyl chains of the lower alkyl esters of acrylic acid and methacrylic acid preferably have from one to four carbon atoms.

The copolymers of vinyl acetate may be those formed by copolymerising vinyl acetate with a copolymerising monomer chosen from a lower alkyl ester of acrylic acid, a lower alkyl ester of methacrylic acid, styrene, acrylonitrile and mixtures thereof.

The latex composition, which is a stabilised suspension of polymer particles in water, typically contains about 40% to 60% by weight of solids. The latex may be stabilised with the aid of a surfactant or a water-soluble colloid, although a surfactant would normally be employed as it usually gives a latex of lower viscosity.

The mixed suspension formed in step c) may also contain an antioxidant, suitably of the non-staining hindered phenol type. Conventionally, such an antioxidant is mixed with water to form a suspension containing from about 40% by weight to about 60% by weight of the dry antioxidant, and the suspension mixed with the suspension formed in step c) in proportions such as to provide from 0.1% to 10% by weight of the dry antioxidant based on the weight of the dry inorganic material.

In step d) the inlet temperature of the spray dryer is preferably less than 400° C., and most preferably less than 350° C., in order to avoid thermal degradation of the elastomer material or combustion of the carbon black.

Filler granules in accordance with the invention may be incorporated into a coating composition for a glass mat-reinforced thermoplastic material by adding to water the granules and the polypropylene powder in proportions ranging from 5 parts by weight of granules to 95 parts by weight of polypropylene to 95 parts by weight of granules to 5 parts by weight of polypropylene. Preferably, sufficient of a latex composition of one of the types described above is then added to provide from 0.5 to 10 parts by weight of latex solids per 100 parts by weight of granules and polypropylene. Finally, a foaming agent is added: this may be anionic, for example sodium dodecyl sulphonate, or nonionic. The ingredients are then vigorously mixed together to form a foam which is conveniently applied by means of a curtain coater to the glass mat-reinforced thermoplastic composition on the Fourdrinier paper making machine.

The invention is further illustrated by the following example.

EXAMPLE

A carbon black powder having an average particle diameter of 0.02 micrometer was dispersed in a quantity of water so as to form a suspension containing 20% by weight of the carbon black, there being dissolved in the water 2% by weight, based on the weight of the dry carbon black, of a sodium polyacrylate dispersing agent having a number average molecular weight of 1680. The carbon black suspension was then added to a suspension containing 60% by weight of a paper filler grade kaolin clay and 0.2% by weight, based on the weight of dry kaolin, of the same dispersing agent as was used for the carbon black. The kaolin clay had a particle size distribution such that 20% by weight consisted of particles having an equivalent spherical diameter larger than 10 microns and 35% by weight consisted of particles having an equivalent spherical diameter smaller than 2 microns. The carbon black suspension was mixed with the kaolin suspension in proportions such that the quantity of dry carbon black was 5.6% by weight, based on the weight of dry kaolin clay.

To the kaolin/carbon black suspension thus formed there was then added, firstly, a latex containing 50% by weight of an elastomeric acrylic copolymer of ethyl acrylate and methyl methacrylate in proportions such that the quantity of the dry elastomeric copolymer was 5.6% by weight, based on the weight of dry kaolin clay; and secondly, a suspension containing 50% by weight of a non-staining antioxidant of the hindered phenol type in proportions such that the quantity of the dry antioxidant was 1.1% by weight, based on the weight of the dry kaolin clay.

The resultant mixed suspension was spray dried in a fountain nozzle spray dryer the inlet temperature of which was 300° C. and the nozzle settings were such that the solid components of the mixture were recovered in the form of dry hollow microspheres of diameters in the range of from 0.01 to 0.1 mm.

Two coating compositions were prepared: in each case quantities of the granules and polypropylene powder was stirred into water followed by sodium dodecyl sulphonate as a foaming agent and a quantity of poly(vinyl acetate) latex. In each case the ingredients were vigorously mixed to produce a foam which was applied to the upper surface of a glass mat-reinforced polypropylene material on the travelling wire mesh belt of a Fourdrinier paper making machine.

The two coating compositions contained, respectively, 30 parts by weight of filler granules to 70 parts by weight of polypropylene powder and 50 parts by weight of filler granules to 50 parts by weight of polypropylene powder. In each case, after the coated glass mat reinforced thermoplastic material had been cut into pieces and the pieces stacked and pressed at 200° C. between steel plates and allowed to cool in the press, the resultant sheet material had a smooth surface with a uniform black colour and no protruding glass fibres.

What is claimed is:

1. A granular filler comprising (a) a particulate inorganic material, (b) from 0.1% to 10% by weight, based on the weight of the inorganic material, of fine carbon black, and (c) sufficient amount of a natural or synthetic latex composition to provide from 1% to 10% by weight of elastomer solids, based on the weight of the inorganic material, wherein the granules comprising said filler have diameters in the range of from 0.01 mm to 0.1 mm.

2. A granular filler as claimed in claim 1, wherein the particulate inorganic material is a kaolinitic clay, a calcined kaolinitic clay, a calcium carbonate, a silicate of aluminum and calcium, bauxite, talc, mica, alumina trihydrate, silica, a carbonate or hydroxide of magnesium, dolomite, calcium sulphate, or titanium dioxide.

3. A granular filler as claimed in claim 2, wherein the inorganic particles comprising said particulate are no larger than 50 microns in diameter.

4. A granular filler as claimed in claim 1, wherein the inorganic particles comprising said particulate are no larger than 50 microns in diameter.

5. A granular filler as claimed in claim 1, wherein the particulate inorganic material is kaolin clay, wherein the carbon black is present at about 5.6% by weight of the clay, and wherein the latex is an elastomeric acrylic copolymer of ethyl acrylate and methyl methacrylate present at about 5.6% by weight of the clay.

* * * * *